(12) United States Patent
Kyung et al.

(10) Patent No.: US 7,339,574 B2
(45) Date of Patent: Mar. 4, 2008

(54) HAPTIC MOUSE INTERFACE SYSTEM FOR PROVIDING FORCE AND TACTILE FEEDBACKS TO USER'S FINGERS AND ARM

(75) Inventors: Ki Uk Kyung, Gwangyang-si (KR); Dong Soo Kwon, Daejeon (KR); Hee Jin Choi, Daegu (KR); Gi Hun Yang, Gongju-si (KR); Seung Woo Son, Seoul (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 848 days.

(21) Appl. No.: 10/733,462

(22) Filed: Dec. 10, 2003

(65) Prior Publication Data
US 2004/0140953 A1      Jul. 22, 2004

(30) Foreign Application Priority Data
Jan. 16, 2003   (KR) ............... 10-2003-0002941
Oct. 21, 2003   (KR) ............... 10-2003-0073554

(51) Int. Cl.
  *G06F 3/033* (2006.01)
(52) U.S. Cl. .................................. 345/163
(58) Field of Classification Search ........... 345/163; 227/46; 242/318
   See application file for complete search history.

(56) References Cited

U.S. PATENT DOCUMENTS

| | | | | |
|---|---|---|---|---|
| 3,594,787 A | * | 7/1971 | Ickles ................ | 340/407.2 |
| 4,280,756 A | * | 7/1981 | Albertinetti ........... | 359/295 |
| 4,787,051 A | * | 11/1988 | Olson ................. | 345/179 |
| 5,226,817 A | * | 7/1993 | Nakajima et al. ........ | 434/113 |
| 5,587,937 A | * | 12/1996 | Massie et al. .......... | 703/7 |
| 5,625,576 A | * | 4/1997 | Massie et al. .......... | 703/6 |
| 5,825,308 A | * | 10/1998 | Rosenberg ............. | 341/20 |
| 5,828,197 A | * | 10/1998 | Martin et al. .......... | 318/567 |
| 5,912,660 A | | 6/1999 | Gouzman et al. | |
| 5,973,689 A | * | 10/1999 | Gallery ............... | 715/859 |
| 5,990,869 A | * | 11/1999 | Kubica et al. ......... | 345/163 |

(Continued)

*Primary Examiner*—Amare Mengistu
*Assistant Examiner*—Eli M Sheets
(74) *Attorney, Agent, or Firm*—Graybeal Jackson Haley LLP

(57) ABSTRACT

A haptic mouse interface system includes a mouse, a first force feedback unit for providing a first force feedback in a first direction of a virtual object to the user's hand and arm, a second force feedback unit for providing a second force feedback in second and third directions to the user's fingers, and a tactile feedback unit for providing tactile sensations to the user's fingers. The first force feedback unit has first and second encoders to receive signals relating to a first direction of the virtual object, first and second motors driven by the first and second encoders, and a linkage, which is connected between shafts of the first and second motors and the mouse. The second force feedback unit is provided in the mouse, and has a third encoder to receive a signal relating to the second and third directions of the virtual object, a third motor driven by the third encoder and having a shaft, a pair of finger pads provided at both sides of the mouse and linearly moved by the third motor. The tactile feedback unit is provided in the mouse, and has actuators attached to the mouse, and a plurality of pins coupled to the actuators to come into contact with the user's fingers, to provide pressure or vibration exhibiting the surface properties of the virtual object to the user's fingers.

8 Claims, 8 Drawing Sheets

U.S. PATENT DOCUMENTS

| | | | |
|---|---|---|---|
| 5,999,168 A * | 12/1999 | Rosenberg et al. | 345/161 |
| 6,088,019 A * | 7/2000 | Rosenberg | 345/156 |
| 6,100,874 A * | 8/2000 | Schena et al. | 345/157 |
| 6,125,385 A * | 9/2000 | Wies et al. | 709/203 |
| 6,166,723 A * | 12/2000 | Schena et al. | 345/184 |
| 6,191,774 B1 | 2/2001 | Schena et al. | |
| 6,271,833 B1 * | 8/2001 | Rosenberg et al. | 345/161 |
| 6,278,441 B1 | 8/2001 | Gouzman et al. | |
| 6,288,705 B1 * | 9/2001 | Rosenberg et al. | 345/163 |
| 6,342,880 B2 * | 1/2002 | Rosenberg et al. | 345/161 |
| 6,353,427 B1 * | 3/2002 | Rosenberg | 345/156 |
| 6,422,942 B1 * | 7/2002 | Jeffway et al. | 463/31 |
| 6,469,692 B2 * | 10/2002 | Rosenberg | 345/161 |
| 6,636,197 B1 * | 10/2003 | Goldenberg et al. | 345/156 |
| 6,717,573 B1 * | 4/2004 | Shahoian et al. | 345/161 |
| 7,209,115 B2 * | 4/2007 | Shibazaki | 345/156 |
| 2002/0024501 A1 * | 2/2002 | Shalit | 345/163 |
| 2002/0050978 A1 * | 5/2002 | Rosenberg et al. | 345/156 |
| 2006/0033716 A1 * | 2/2006 | Rosenberg et al. | 345/163 |

* cited by examiner

HAPTIC MOUSE INTERFACE SYSTEM FOR PROVIDING FORCE AND TACTILE FEEDBACKS TO USER'S FINGERS AND ARM

PRIORITY CLAIM

This application claims priority from Korean Patent Application Nos. 10-2003-0002941 and 10-2003-0073554 filed 16 Jan. 2003 and 21 Oct. 2003, respectively, which is herein incorporated by references.

FIELD OF THE INVENTION

The present invention relates to a haptic mouse interface system which provides a user with force and tactile feedbacks to allow the user to feel the mechanical properties and tactile sensations of a virtual object, and more particularly, to a haptic mouse interface system which provides a user with force and tactile feedbacks to allow a user to feel as if he/she is in contact with the virtual object.

DESCRIPTION OF THE PRIOR ART

In general, computer users experience virtual objects by manipulating games, simulations and the like in virtual realities provided by computers. Such an interface device, which allows a user to interact with a computer, includes a mouse, a joystick, a steering wheel, a tablet and so on. The interface device generates control signals or commands to a virtual object, or allows a user to physically feel a virtual object. Accordingly, the interface device requires an additional unit, which is familiar to a user, for providing force feedback to the user, so as to enable the user to feel the physical properties of a virtual object.

A conventional interface device, which has such a unit for generating force feedback, is disclosed in U.S. Pat. No. 6,191,774. FIG. 1 is a perspective view of the mouse interface disclosed in U.S. Pat. No. 6,191,774.

As shown in FIG. 1, the mouse interface includes a mouse 10, a mechanical linkage 20 and a transducer system 30.

The linkage 20 is a 5-member linkage including a ground member 25, a first base member 21 coupled to the ground member 25, a second base member 22 coupled to the ground member 25, a link member 23 coupled to the first base member 21, and an object member 24 coupled to the link member 23, the second base member 22 and the mouse 10. The members of the linkage 20 are rotatably coupled to one another through the use of rotatable pivots or bearing assemblies having one or more bearings.

The transducer system 30 includes sensors 31 and actuators 32. The sensors 31 collectively sense the movement of the mouse 10 in the provided degrss of freedom and send appropriate signals to the electronic portion of the interface. The actuators 32 transmit forces to the mouse 10 in a space, i.e., in two (or more) degrees of freedom of the user object. The actuators 32 are electromagnetic voice coil actuators, which provide a force through the interaction of a current in a magnetic field.

By the above-described configuration, a user using the interface can sense motions of a virtual object in an application program driven by a computer through mechanical vibration of the mouse.

However, the interface can allow a user to feel only tactile sensations, such as a motion and a vibration of a virtual object, but cannot allow the user to perceive the various mechanical properties of the virtual object, such as the size, weight, shape and hardness of the virtual object. In addition, the above interface cannot offer the motions of a virtual object separately to user's fingers and arm.

SUMMARY OF THE INVENTION

Accordingly, the present invention has been made keeping in mind the above problems occurring in the prior art, and an object of the present invention is to provide a haptic mouse interface system having a first force feedback unit and a second force feedback unit, which provides the user's fingers and arm with force and tactile feedbacks to allow the user to perceive the various mechanical properties and tactile sensations of the virtual object, such as the size, weight, shape and hardness of the virtual object.

Another object of the present invention is to provide a haptic mouse interface system for providing the user's fingers and arm with force and tactile feedbacks with less tiredness.

In order to accomplish the above object, the present invention provides a haptic mouse interface system which provides force and tactile feedbacks to a user's hand and fingers to allow the user to feel a virtual object displayed on a computer screen, the haptic mouse interface system including: a mouse; a first force feedback unit including: first and second encoders to receive signals respectively corresponding to a mechanical property in a first direction of the virtual object; first and second motors driven by the first and second encoders and having shafts, respectively; and a linkage, which is operationally connected at a ground joint thereof to shafts of the first and second motors and connected at another joint to the mouse to provide a first force feedback to the user's hand and arm; a second force feedback unit provided in the mouse, including: a third encoder to receive a signal corresponding to the mechanical property in second and third directions perpendicular to the first direction of the virtual object; a third motor driven by the third encoder and having a shaft; and a pair of finger pads provided at both sides of the mouse and linearly moved by the third motor to provide a second force feedback to the user's fingers; and a tactile feedback unit provided in the mouse, including: at least one actuator attached to the mouse; and a plurality of pins coupled to the actuator to come into contact with the user's fingers, wherein the at least one actuator receives signals corresponding to surface properties of the virtual object, and drives the plurality of pins according to the received signals, thereby providing pressure or vibration exhibiting the surface properties of the virtual object to the user's fingers.

The second force feedback unit may further include a pair of cables, which are connected to the pair of finger pads, respectively, and wound around the shaft of the third motor, so as to transform a rotational movement of the third motor into linear movements of the pair of finger pads.

Each of the pair of finger pads may includes a pin head to be in contact with the user's fingers and having a slit, and a pin rod extended from the pin head and having a longitudinal guide groove formed on an outer surface thereof. Each of the pair of cables surrounds the corresponding finger pad through the guide groove formed on the pin rod and the slit of the pin head.

Each of the finger pads may include a bolt tightened into a threaded hole of the pin head, and a tension bar having a hole through which the bolt passes and moves together with the bolt. Thus, the tension bar is moved close to and away from the pin head when the bolt is tightened and loosened.

The linkage may be comprised of four bars hingedly connected at ends portions thereof, in which two bars connected to a first hinge point corresponding to the first joint of the linkage are operationally connected to the shafts of the first and second motors to be moved, respectively, and the other two bars are connected to a second hinge point corresponding to the second joint of the linkage which is positioned diagonally opposite to the first hinge point and connected to the mouse.

The haptic mouse interface system may further include a mouse plate fixed to the first force feedback unit and positioned between the linkage and the mouse so as to allow a user's wrist to be placed thereon.

The mouse plate may be formed with a communicating hole through which the second hinge point of the linkage is connected to the mouse. The communicating hole is formed into a sector shape having an area larger than an operating range of the second hinge point fixed to the mouse.

The tactile feedback unit may include a plurality of plate-shaped actuators which can be bent upon its activation, and a holding base attached to the mouse and having a plurality of steps. The plurality of plate-shaped actuators is sequentially attached to the corresponding steps of the holding base, respectively, and is provided at its free end with the plurality of pins.

The actuators of the tactile feedback unit may be bimorph type of bendable piezoelectric actuator.

The pins coupled to the actuator may be arranged such that free ends of the pins are positioned at the same plane.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The present invention will be described in further detail by way of example with reference to the accompanying drawings.

Figure 1:
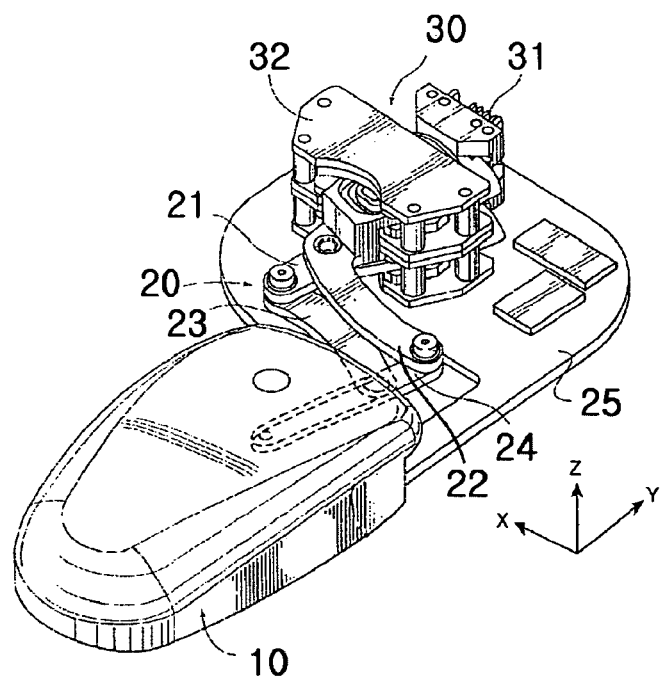
FIG. 1 is a perspective view schematically showing a conventional mouse interface which provides a user with force feedback according to a shape of a virtual object.
Figure 2:
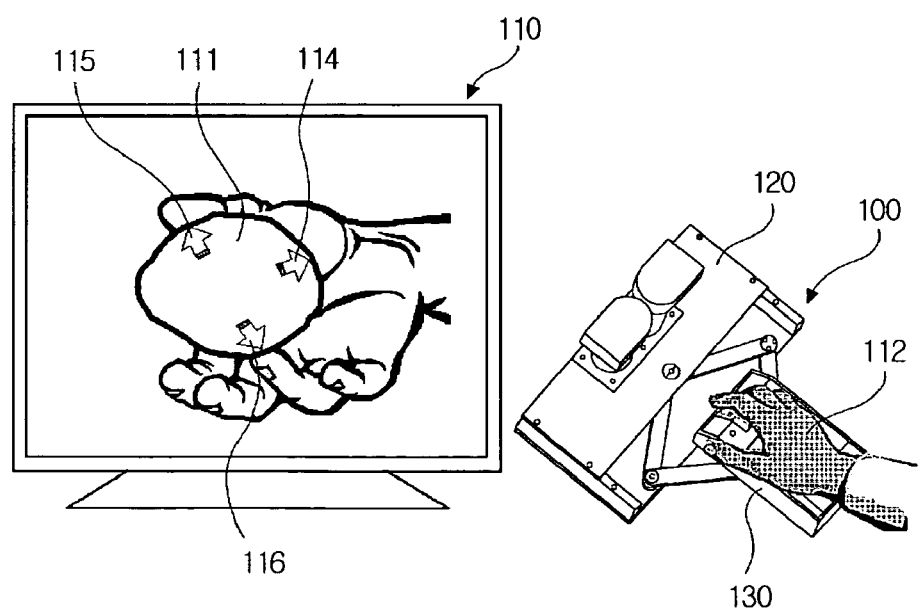
FIG. 2 is a schematic view of a haptic mouse interface system according to an embodiment of the present invention, which is constructed to provide the user's fingers and arm with force and tactile feedbacks so as to allow the user to perceive physical properties of a virtual object.
Figure 3:
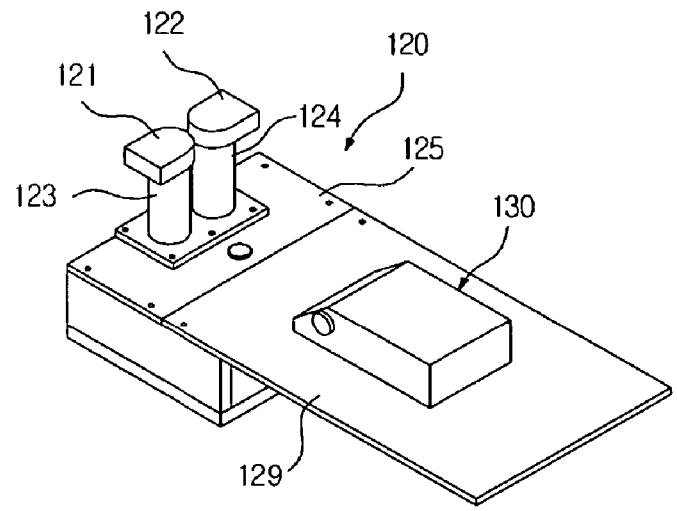
FIG. 3 is a perspective view of the haptic mouse interface system shown in FIG. 2.

FIG. 2 is a schematic view of a haptic mouse interface system according to an embodiment of the present invention, which is constructed to provide the user's fingers and arm with force feedback so as to allow the user to perceive the mechanical properties of a virtual object, and FIG. 3 is a perspective view of the haptic mouse interface system shown in FIG. 2.

As shown in FIGS. 2 and 3, the haptic mouse interface system 100 of the present invention receives signals corresponding to mechanical properties in a first direction 114 of a virtual object 111 displayed on a display screen 110 via first and second encoders 121 and 122 of a first force feedback unit 120. The first and second encoders 121 and 122 drive first and second motors 123 and 124 to rotate shafts thereof, thus providing force feedback to a user's hand grasping a second force feedback unit 130. Further, the haptic mouse interface system 100 receives signals corresponding to the mechanical properties in the second and third directions 115 and 116 perpendicular to the first direction 114 of a virtual object 111 via a third encoder 132 (FIG. 4) of the first force feedback unit 120, and then drives a third motor 133 (FIG. 4) connected to the third encoder 132. The third motor 133 moves left and right finger pads 140 and 141 provided at both sides of the second force feedback unit 130, thus providing force feedback to the user's thumb and fourth finger.

Figure 4:
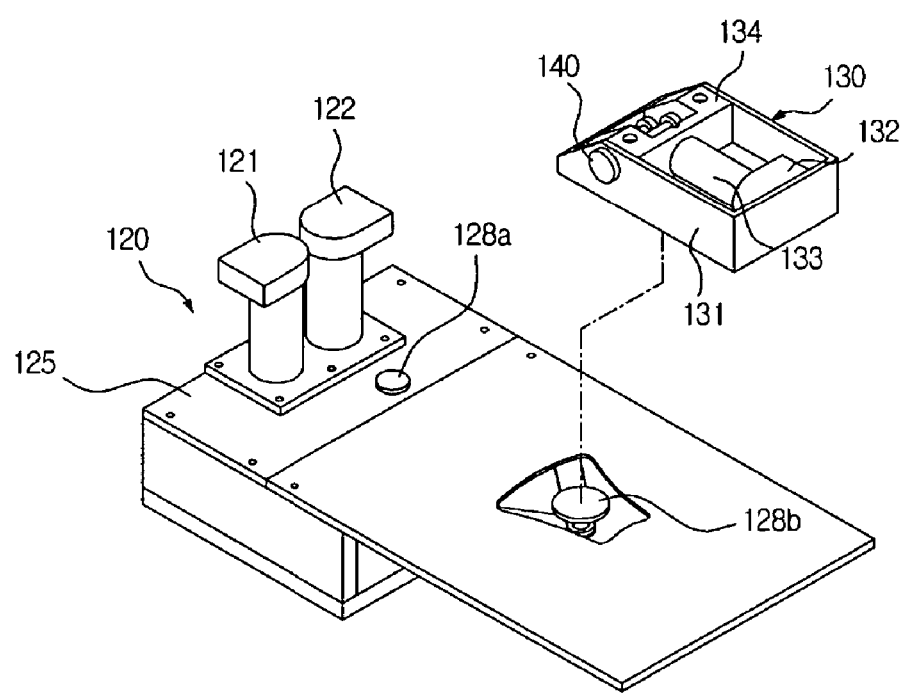
FIG. 4 is an exploded perspective view showing the first force feedback unit and the second force feedback unit of the haptic mouse interface system shown in FIG. 3.
Figure 5:
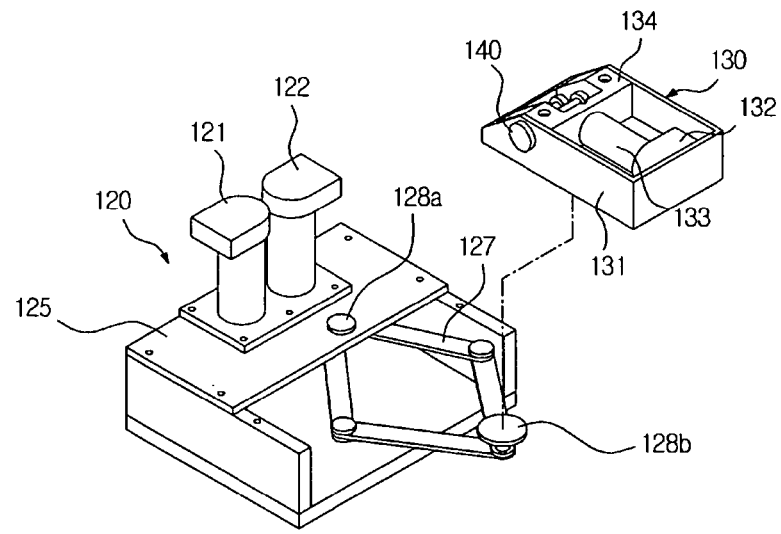
FIG. 5 is a perspective view showing a linkage of the first force feedback unit to drive the second force feedback unit, in which a mouse plate is removed from the haptic mouse interface system.
Figure 6:
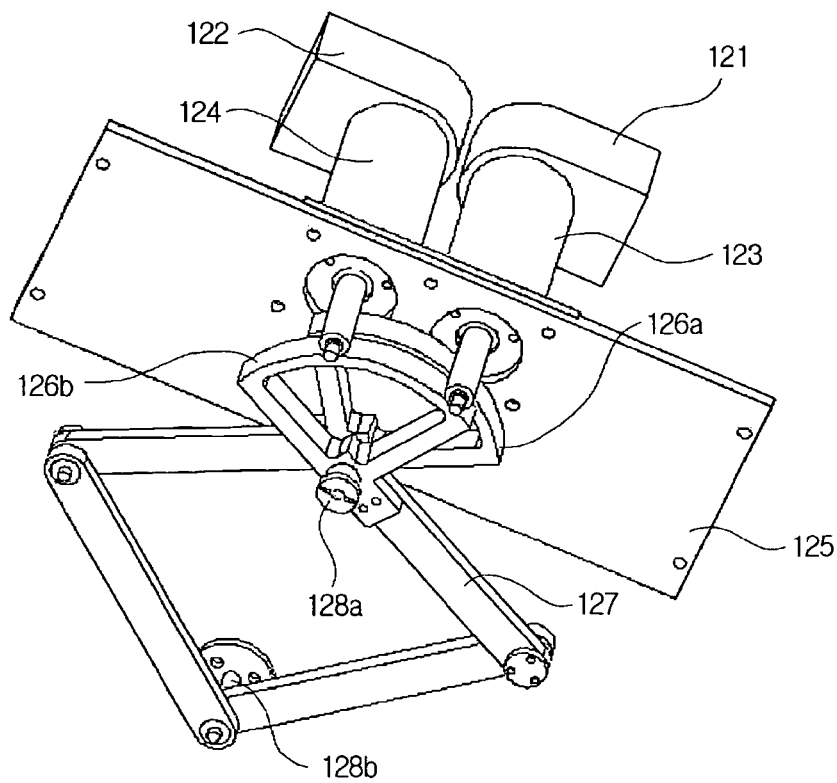
FIG. 6 is a partial perspective view of the first force feedback unit showing a way of coupling between motor shafts and the linkage shown in FIG. 5.

FIG. 4 is an exploded perspective view showing the first force feedback unit and the second force feedback unit of the haptic mouse interface system shown in FIG. 3, FIG. 5 is a perspective view showing a linkage of the first force feedback unit to drive the second force feedback unit, in which a mouse plate is removed from the haptic mouse interface system, and FIG. 6 is a partial perspective view of the first force feedback unit showing a way of coupling between motor shafts and the linkage.

As shown in FIGS. 2 to 6, the first force feedback unit 120 of the haptic mouse interface system 100 includes a cabinet 125, which has a pair of plates spaced apart from each other. On the upper plate of the cabinet 125, the first and second motors 123 and 124 are mounted. The first and second encoders 121 and 122 are coupled to upper ends of the first and second motors 123 and 124, respectively.

Each of the encoders includes a plurality of input terminals and a plurality of output terminals. When a signal is applied to one of the input terminals of the encoder, an output signal is generated by combinations of output terminals corresponding to the one of the input terminals. The first and second encoders 121 and 122 receive signals corresponding to the mechanical properties in connection with the first direction 114 of the virtual object 111 displayed on the display screen 110, and drives the first and second motors 123 and 124 to rotate the shafts thereof at respective rotational speeds according to the received signals.

The first and second motors 123 and 124 are connected at end portions thereof to a four-member linkage 127 positioned inside the cabinet 125. A first hinge pin 128a of the linkage 127 is fixed to the upper plate of the cabinet 125. First and second sector-shaped link connectors 126a and 126b are rotatably fitted on the first hinge pin 128a, respectively, such that the first and second link connectors 126a and 126b are rotated by respective corresponding cables, wherein each of the cables is wound around the first and second motor shafts and coupled at its both ends to both side ends of the link connector, respectively. Since the first and second link connectors 126a and 126b are integrally joined to bars of the linkage 127, respectively, the linkage 127 is driven by rotation of the first and second motors 123 and 124. A second hinge pin 128b, which is positioned diagonally opposite to the first hinge pin 128a of the linkage 127, is fixed to the second force feedback unit 130.

The mouse plate 129 is attached to the upper plate of the cabinet 125 to be disposed between the second force feedback unit 130 and the linkage 127, so that a wrist of a user's hand grasping the second force feedback unit 130 can be placed on the mouse plate 129. The mouse plate 129 is formed with a communicating hole through which the second hinge pin 128b and the second force feedback unit 130 are coupled to each other. Since the second force feedback unit 130 moves two-dimensionally on the mouse plate 129 with reference to the first hinge pin 128a by the operation of the linkage 127, the communicating hole of the mouse plate 129 is preferably formed into a sector shape, which is larger than an operating range of the second hinge pin 128b fixed to the second force feedback unit 130.

Figure 7:
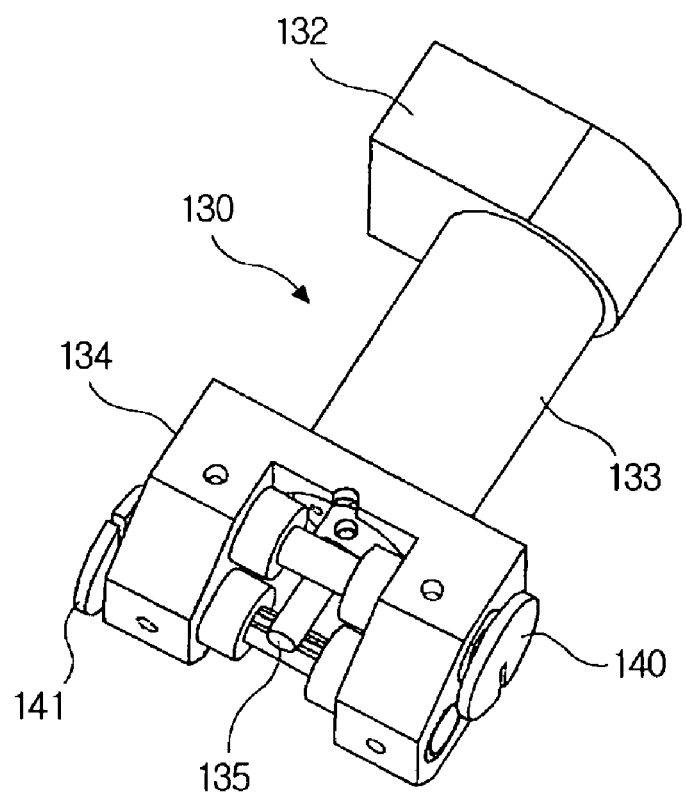
FIG. 7 is a perspective view showing an internal structure of the second force feedback unit of the haptic mouse interface system shown in FIG. 4.
Figure 8:
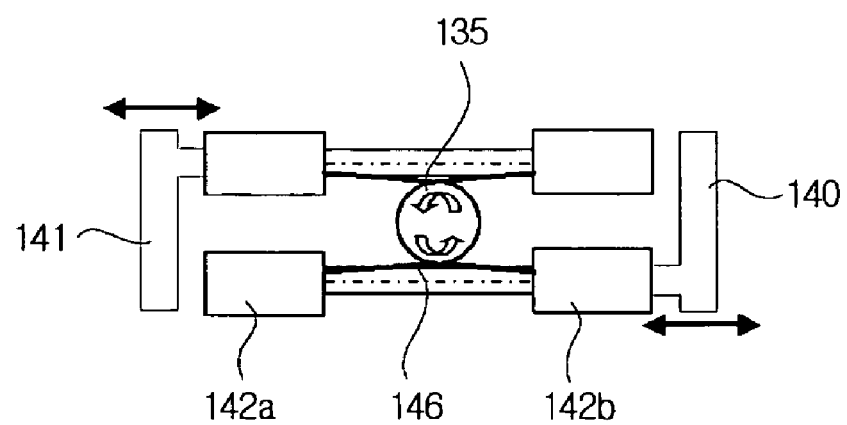
FIG. 8 is a front view schematically showing an operational relationship between finger pads and a motor shaft provided in the second force feedback unit shown in FIG. 7.
Figure 9:
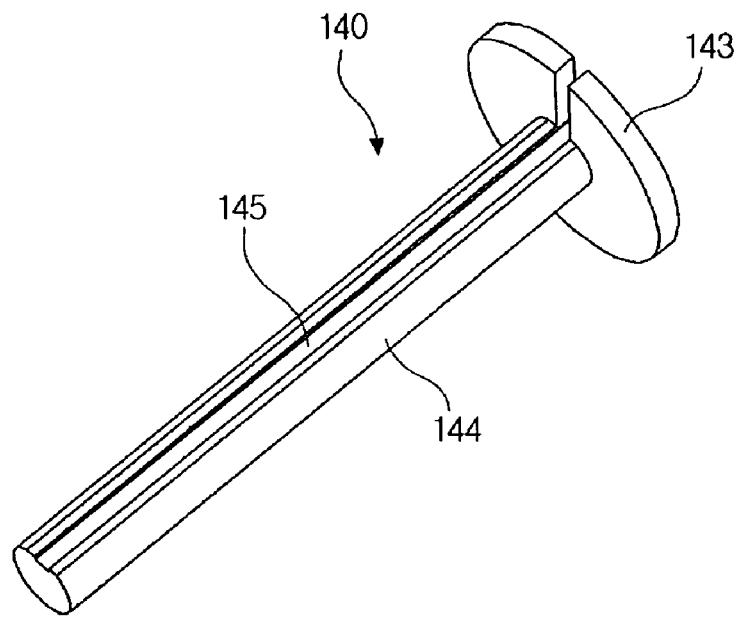
FIG. 9 is a perspective view showing one of the finger pads shown in FIG. 8.
Figure 10:
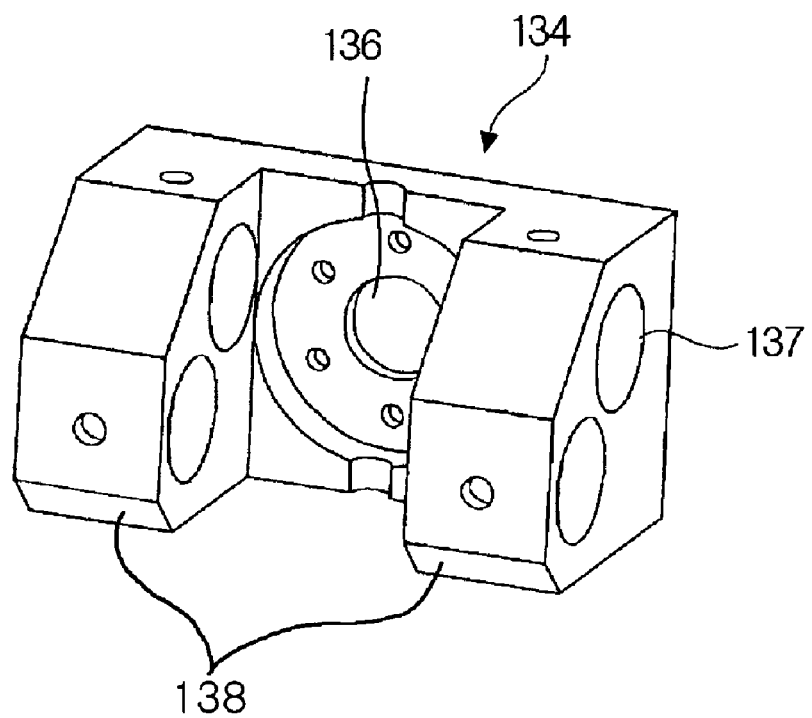
FIG. 10 is a perspective view showing a body on which the finger pads and the motor shaft of the second force feedback unit shown in FIG. 7 are mounted.

FIG. 7 is a perspective view showing an internal structure of the second force feedback unit of the haptic mouse interface system shown in FIG. 4, FIG. 8 is a front view schematically showing a relationship between finger pads and a motor shaft provided in the second force feedback unit shown in FIG. 7, FIG. 9 is a perspective view showing one of the finger pads shown in FIG. 8, and FIG. 10 is a perspective view showing a body on which the finger pads and the motor shaft of the second force feedback unit shown in FIG. 7 are mounted.

As shown in FIGS. 2, 4, 7 and 10, the second force feedback unit 130 includes a hexahedral case 131 containing the third encoder 132. The second hinge pin 128b is fixed to a bottom surface of the case 131. The third encoder 132 is coupled to the third motor 133, so as to drive the third motor 133 according to the mechanical information of a virtual object in the second and third directions 115 and 116 which is transmitted to the third encoder 132. The third motor 133 is coupled to a body 134, and the motor shaft 135 of the third motor 133 protrudes through a first fitting hole 136 formed in the body 134.

The body 134 is cut away at its center portion, such that the body 134 is of U-shaped and has protrusions 138 at both sides. Each of the protrusions 138 of the body 134 is laterally formed at each side portion of the body 134, and has second fitting holes 137, respectively, into which a pair of finger pads 140 are fitted. The center portion of the body 134 has a first fitting hole 136 into which the motor shaft 135 is fitted.

Each of the finger pads 140, which is inserted into one of the second fitting holes 137 of the body 134, includes a disc-shaped pin head 143 having a contact surface, with which the user's fingers contact, and a pin rod 144 extended from an inner surface of the pin head 143. The pin rod 144 is longitudinally formed with a guide groove 145 in which a cable 146 is disposed. The pin head 143 is formed with a slit 147, so that the cable 146 received in the guide groove 145 passes through the slit 147.

The pair of finger pads 140 and 141 are inserted into the second fitting holes 137 to be positioned on and under the motor shaft 135 inserted in the first fitting hole 136, respectively. The pair of finger pads 140 and 141 are linearly moved toward and away from each other by the rotation of the motor shaft 135. To this end, each of the cables 146 is wound around the motor shaft 135, and tightly fixed to the corresponding finger pad 140 or 141 at its both ends. In order to reduce is friction between the pin rods 144 and the second fitting holes 137 during the linear movement of the pin rods 144, the finger pads 140 and 141 are provided with ball bushings 142a and 142b fitted thereon.

Figure 11:
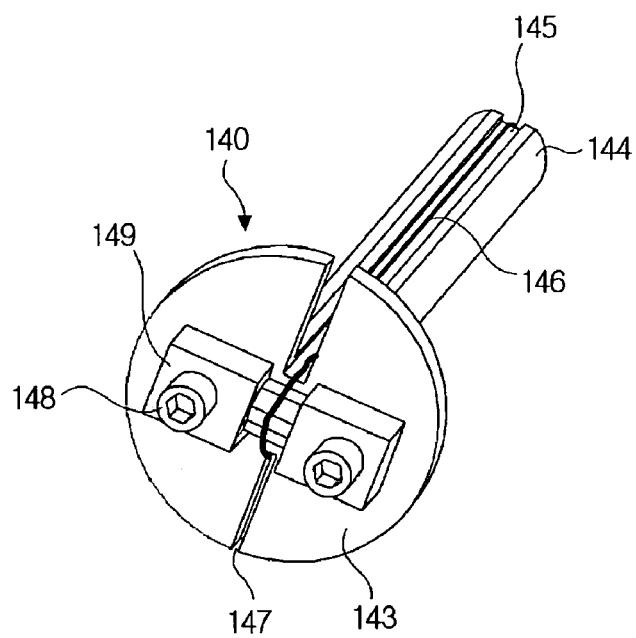
FIG. 11 is a perspective view showing a modification of the finger pads shown in FIG. 9.

FIG. 11 is a perspective view showing a modification of the finger pad shown in FIG. 9. The finger pad 140 shown in FIG. 11 is provided on an outer surface of the pin head 143 with a pair of bolts 148 and a tension bar 149, in order to control a tension force of the cable 146. More specifically, the cables 146 must be maintained in a tightened state so as to reliably transform a rotational movement of the motor shaft 135 into a linear movement of the finger pads 140 and 141. To this end, the tension bar 149 is surrounded with the cable 146, and the tension bar 149 is movable close to and away from the pin head 143 by tightening and loosening either or both of the pair of bolts 148. That is, when either or both of the bolts 148 are rotated in a releasing direction, the tension bar 149 is moved away from the pin head 143, thus tightening the cable 146 surrounding the finger pads 140 or 141.

A haptic mouse interface system according to another embodiment of the present invention, which includes a tactile feedback unit to provide tactile sensations of a virtual object to user's fingers, will now be described.

Figure 12:
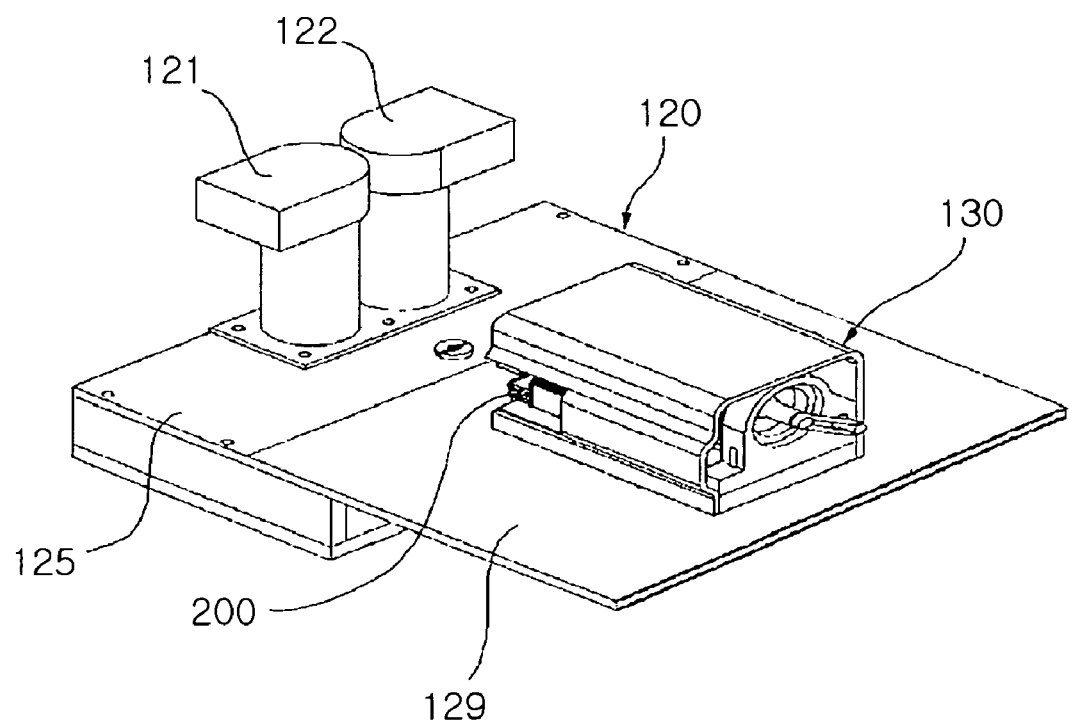
FIG. 12 is a perspective view of a haptic mouse interface system including a tactile feedback unit, according to another embodiment of the present invention.
Figure 13:
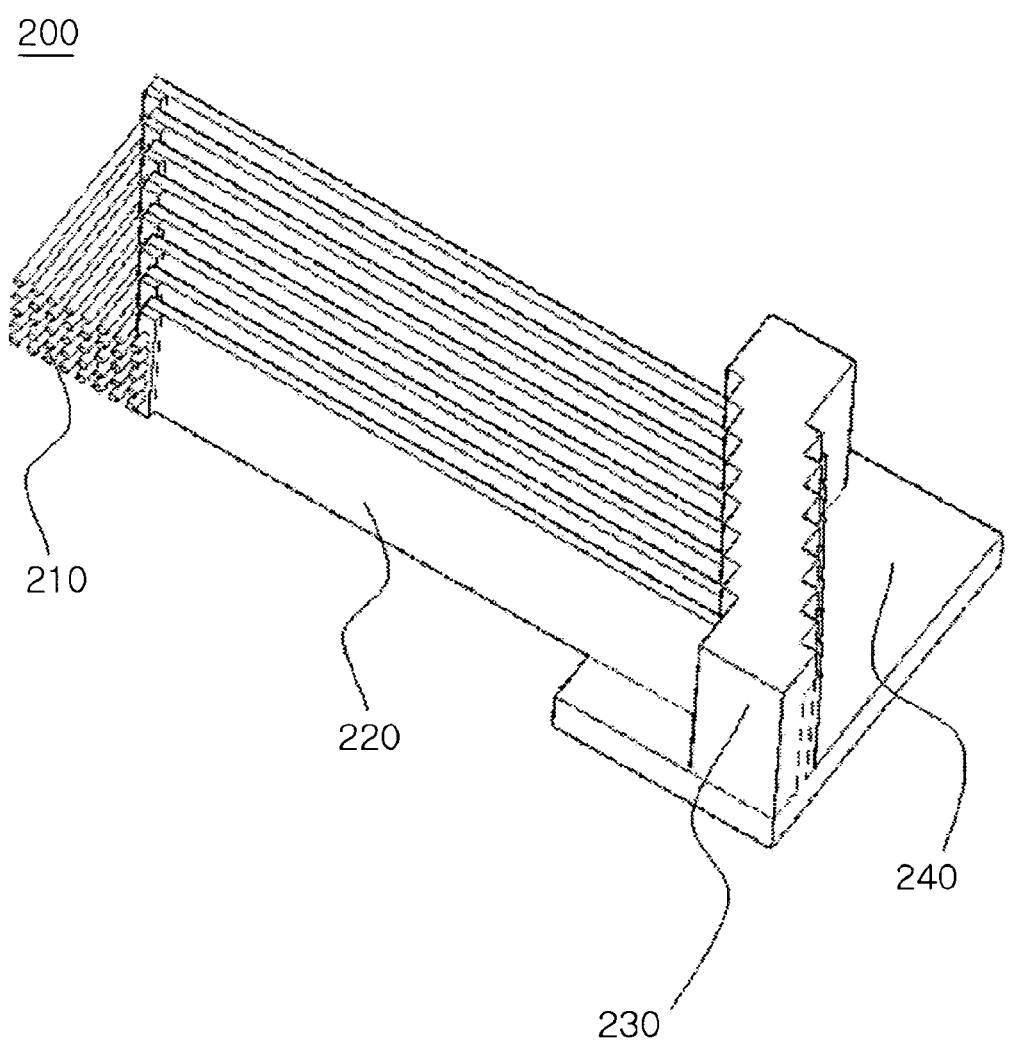
FIG. 13 is a perspective view of the tactile feedback unit.
Figure 14:
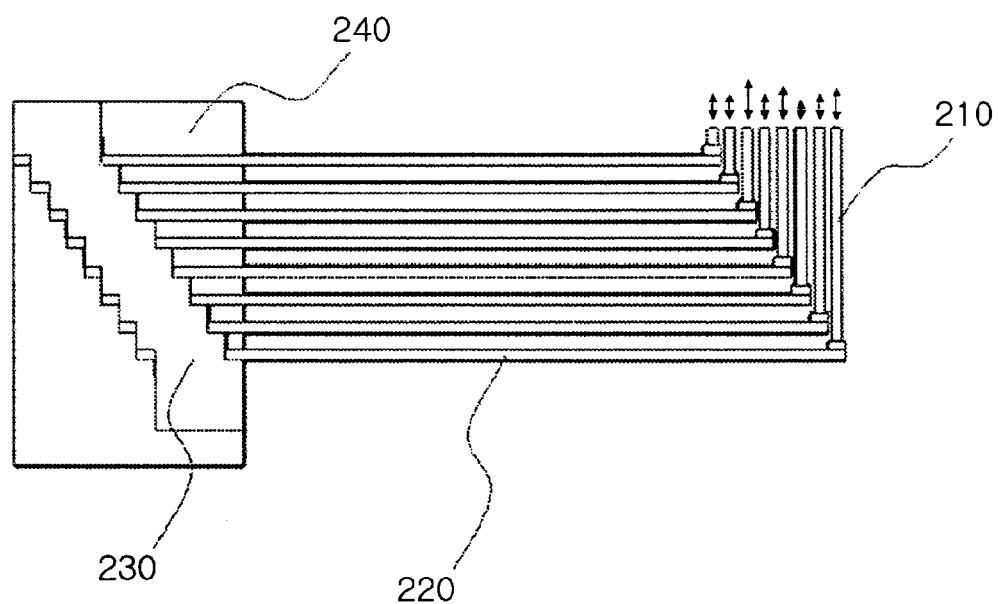
FIG. 14 is a plan view of the tactile feedback unit of FIG. 13.
Figure 15:
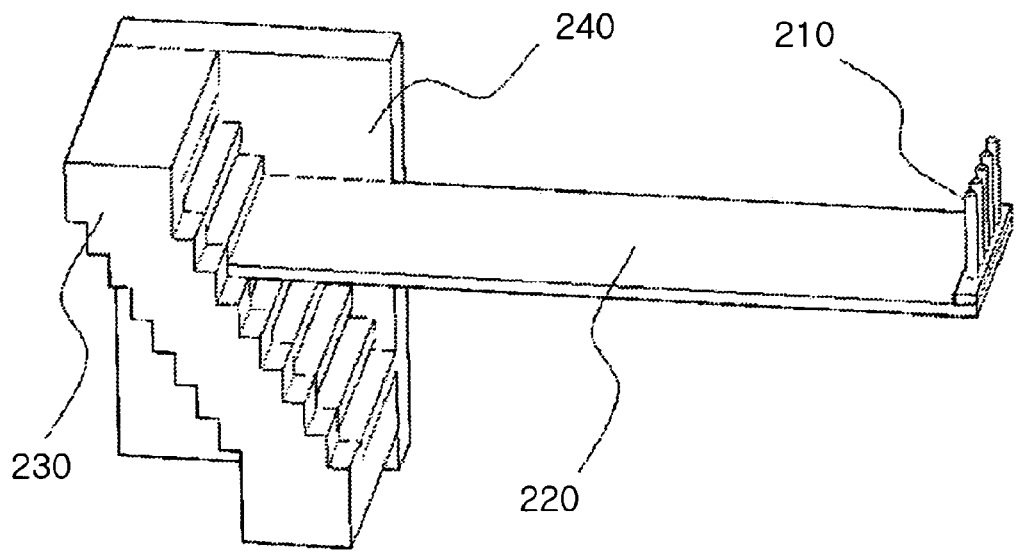
FIG. 15 is a perspective view showing only one actuator of the tactile feedback unit, which actuates pins thereof to provide tactile sensation to the user's fingers.

FIG. 12 is a perspective view of a haptic mouse interface system including a tactile feedback unit, according to another embodiment of the present invention, which is intended to provide tactile sensations to user's fingers, FIG. 13 is a perspective view of the tactile feedback unit, FIG. 14 is a plan view of the tactile feedback unit of FIG. 13, and FIG. 15 is a perspective view showing only one actuator of the tactile feedback unit, which actuates pins thereof to provide tactile sensation to the user's fingers.

As shown in FIGS. 13 and 14, the tactile feedback unit 200 includes a pin array having plurality sets of pins 210, which come into contact with user's fingers, and a plurality of actuators 220 to drive the pins 210 of the pin array. Signals according to a shape and surface properties of a virtual object are transmitted to each of the actuators 220 of the tactile feedback unit 200. The tactile feedback unit 200 changes vibration frequencies and vibration amplitudes of the pins 210 according to the signals transmitted to the actuators 220, so as to allow the user to feel tactile sensations of the virtual object. Further, the tactile feedback unit 200 can change displacements and pushing forces of the pins 210 to change the pressure acting on user's fingers.

Each of the actuators 220 of the tactile feedback unit 200 is a bimorph type of bendable piezoelectric actuator, which drives the pins 210 fixed to a free end thereof, and controls a vibration frequency, vibration amplitude and pushing force of the pins 210. Each of the actuators 220 is provided at one end thereof with a plurality of pins 210, and is fixed at the other end thereof to a step portion of a holding base 230. The holding base 230 is attached to the second force feedback unit 130 via a support member 230.

Operations of the haptic mouse interface system 100 according to the present invention will now be described.

To allow a user to perceive the mechanical properties of the virtual object 112 displayed on the display screen 110, the haptic mouse interface system 100 provide a user's palm with force feedback in a first direction 114 of the virtual object 111, and the user's fingers grasping the second force feedback unit 130 with force feedback in second and third directions 115 and 116 perpendicular to the first direction 114 of the virtual object 111.

Signals corresponding to the mechanical properties in the first direction of the virtual object 111 are transmitted to the first and second encoders 121 and 122, and thus the first and second encoders 121 and 122 drive the first and second motors 123 and 124 to rotate the shafts thereof. As a result, the first and second motors 123 and 124 drive the linkage 127 connected to the second force feedback unit 130, thus moving the second force feedback unit 130 in a direction corresponding to the first direction 114. Therefore, the second force feedback unit 130 transmits force feedback to a palm and an arm of a user's hand grasping the second force feedback unit 130, thereby allowing the user 112 to perceive the mechanical properties, such as a tactile sensation, weight and size of the virtual object 111.

Meanwhile, signals corresponding to the mechanical properties in the second and third directions of the virtual object 111 are transmitted to the third encoder 132, and thus the third encoder 132 drives the third motor 133 in the second force feedback unit 130 to rotate the shaft thereof. At this time, since the motor shaft 135 is operationally connected to the pair of finger pads 140 and 141 provided at both sides of the second force feedback unit 130, via the cables 146 wound on the motor shaft 135 and fixed to finger pads 140 and 141, the finger pads 140 and 141 are linearly moved in a lateral direction of the second force feedback unit 130 by rotation of the third motor 133. Since the user's thumb and second finger are in contact with the pin heads 143 of the finger pads 140 and 141, the user can perceive mechanical properties such as a surface roughness of the virtual object 111, a force for gripping the virtual object ill and so on.

Further, the tactile feedback unit 200, which is coupled to the second force feedback unit, drives the pins 210 of the pin array fixed to the plurality of actuators 220 according to signals corresponding to a shape and surface properties of a virtual object, thereby transmitting pressure, vibration and tactile sensation to user's fingers.

As described above, the present invention provides a haptic mouse interface system, which provides the user's fingers and arm with force feedback to allow the user to perceive the various mechanical properties of the virtual object, such as the size, weight, shape and hardness of the virtual object.

In addition, the haptic mouse interface system according to the present invention enables a user to perceive a fitted state and a dimensional tolerance of assembling components by a tactile sensation in design tasks by CAD, and enables a user to directly feel qualities of goods displayed in shopping malls on the Internet as well as virtual objects displayed during computer games.

Although a haptic mouse interface system according to a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A haptic mouse interface system which provides force and tactile feedbacks to a user's hand and fingers to allow the user to feel a virtual object displayed on a computer screen, the haptic mouse interface system comprising:

a mouse;

a first force feedback unit including:
first and second encoders to receive signals respectively corresponding to a mechanical property in a first direction of the virtual object;
first and second motors driven by the first and second encoders and having shafts, respectively; and
a linkage, which is operationally connected at a ground joint thereof to shafts of the first and second motors and connected at another joint to the mouse to provide a first force feedback to the user's hand and arm;

a second force feedback unit provided in the mouse, including:
a third encoder to receive a signal corresponding to the mechanical property in second and third directions perpendicular to the first direction of the virtual object;
a third motor driven by the third encoder and having a shaft; and
a pair of finger pads provided at both sides of the mouse and linearly moved by the third motor to provide a second force feedback to the user's fingers;

a tactile feedback unit provided in the mouse, including:
at least one actuator attached to the mouse; and
a plurality of pins coupled to the actuator to come into contact with the user's fingers, wherein the actuator receives signals corresponding to surface properties of the virtual object, and drives the plurality of pins according to the received signals, thereby providing pressure or vibration exhibiting the surface properties of the virtual object to the user's fingers;

wherein the second force feedback unit further includes a pair of cables, which are connected to the pair of finger pads, respectively, and wound around the shaft of the third motor, so as to transform a rotational movement of the third motor into linear movements of the pair of finger pads; and wherein each of the pair of finger pads includes a pin head to be in contact with the user's fingers and having a slit, and a pin rod extended from the pin head and having a longitudinal guide groove formed on an outer surface thereof, and wherein each of the pair of cables surrounds the corresponding finger pad through the guide groove formed on the pin rod and the slit of the pin head.

2. The haptic mouse interface system as set forth in claim 1, wherein each of the finger pads includes a bolt tightened into a threaded hole of the pin head, and a tension bar having a hole through which the bolt passes and moves together with the bolt, whereby the tension bar is moved close to and away from the pin head when the bolt is tightened and loosened.

3. The haptic mouse interface as set forth in claim 1, wherein the linkage is comprised of four bars hingedly connected at end portions thereof, in which two bars connected to a first hinge point corresponding to the first joint of the linkage are operationally connected to the shafts of the first and second motors to be moved, respectively, and the other two bars are connected to a second hinge point corresponding to the second joint of the linkage which is positioned diagonally opposite to the first hinge point and connected to the mouse.

4. The haptic mouse interface system as set forth in claim 3, further comprising a mouse plate fixed to the first force feedback unit and positioned between the linkage and the mouse so as to allow a user's wrist to be placed thereon.

5. The haptic mouse interface system as set forth in claim 4, wherein the mouse plate is formed with a communicating hole through which the second hinge point of the linkage is connected to the mouse, the communicating hole being formed into a sector shape having an area larger than an operating range of the second hinge point fixed to the mouse.

6. The haptic mouse interface system as set forth in claim 1, wherein the tactile feedback unit includes a plurality of plate-shaped actuators which can be bent upon its activation, and a holding base attached to the mouse and having a plurality of steps, the plurality of plate-shaped actuators being sequentially attached to the corresponding steps of the holding base, respectively, and being provided at its free end with the plurality of pins.

7. The haptic mouse interface system as set forth in claim 6, wherein the actuators of the tactile feedback unit are bimorph type bendable piezoelectric actuator.

8. The haptic mouse interface system as set forth in claim 1, wherein the pins coupled to the actuator are arranged such that free ends of the pins are positioned at the same plane.

\* \* \* \* \*